United States Patent
Kapocs et al.

(10) Patent No.: US 8,887,857 B2
(45) Date of Patent: Nov. 18, 2014

(54) SAFETY ARRANGEMENT FOR VEHICLE PEDAL

(71) Applicant: Volvo Car Corporation, Gothenburg (SE)

(72) Inventors: Marcel Kapocs, Saro (SE); Mattias Ulenius, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/645,088

(22) Filed: Oct. 4, 2012

(65) Prior Publication Data

US 2013/0087010 A1    Apr. 11, 2013

(30) Foreign Application Priority Data

Oct. 6, 2011  (EP) ..................................... 11184191

(51) Int. Cl.
- G05G 1/32 (2008.04)
- B60T 7/06 (2006.01)
- B60R 21/09 (2006.01)
- G05G 1/323 (2008.04)

(52) U.S. Cl.
CPC ................. B60R 21/09 (2013.01); B60T 7/065 (2013.01); G05G 1/323 (2013.01)
USPC ............................... 180/274; 74/512; 74/560

(58) Field of Classification Search
CPC .......... B60R 21/09; B60T 7/065; G05G 1/32; G05G 1/323; G05G 1/327
USPC .............................. 180/274; 74/560, 512, 513
See application file for complete search history.

(56) References Cited

U.S. PATENT DOCUMENTS

| | | | | |
|---|---|---|---|---|
| 5,996,439 A | * | 12/1999 | Elton et al. ...................... | 74/512 |
| 6,178,846 B1 | * | 1/2001 | Specht et al. ................... | 74/512 |
| 6,786,109 B2 | * | 9/2004 | Mueller et al. ................. | 74/512 |
| 6,889,575 B2 | * | 5/2005 | Thistleton et al. .............. | 74/512 |

(Continued)

FOREIGN PATENT DOCUMENTS

| | | |
|---|---|---|
| EP | 1253051 A1 | 10/2002 |
| FR | 2848959 A1 | 6/2004 |
| WO | 03045750 A1 | 6/2003 |

OTHER PUBLICATIONS

ISA European Patent Office, Extended European Search Report of EP11184191, Mar. 14, 2012, Netherlands, 6 pages.

*Primary Examiner* — Drew Brown
*Assistant Examiner* — Timothy Wilhelm
(74) *Attorney, Agent, or Firm* — Alleman Hall McCoy Russell & Tuttle LLP (57) ABSTRACT

The present disclosure relates to a safety arrangement for a vehicle pedal, comprising a pedal structure including a pedal arm with an elongated shape for carrying a pedal plate; a bracket, which is fixedly connected to the pedal arm; a pedal hub, to be arranged in order to transfer a movement of the pedal structure to a vehicular system. The pedal structure is in a first position relative to the pedal hub during normal operation of the pedal structure. Further, the pedal structure is displaceable from the first position relative to the pedal hub to a second position relative to the pedal hub, wherein, when in the second position, the pedal structure is at least partly operatively decoupled from the pedal hub.

20 Claims, 5 Drawing Sheets

(56) References Cited

U.S. PATENT DOCUMENTS

| | | | |
|---|---|---|---|
| 7,267,194 B2 * | 9/2007 | Miyoshi | 180/274 |
| 7,516,683 B2 * | 4/2009 | Jasseron | 74/512 |
| 7,665,387 B2 * | 2/2010 | Park | 74/512 |
| 7,665,565 B2 * | 2/2010 | Tokumo et al. | 180/274 |
| 7,926,383 B2 * | 4/2011 | Choi et al. | 74/512 |
| 8,479,866 B2 * | 7/2013 | Tokumo et al. | 180/274 |
| 2007/0137398 A1 * | 6/2007 | Tokumo et al. | 74/512 |
| 2010/0043592 A1 * | 2/2010 | Johansson | 74/560 |

* cited by examiner

SAFETY ARRANGEMENT FOR VEHICLE PEDAL

RELATED APPLICATIONS

The present application claims priority to European Patent Application No. 11184191.2 filed Oct. 6, 2011, the entire contents of which are hereby incorporated by reference.

FIELD

The present disclosure relates to a safety arrangement for a vehicle pedal. The disclosure further relates to a vehicle comprising such a safety arrangement.

BACKGROUND

In modern vehicles collision safety is an important issue. In a collision, a vehicle may decelerate strongly. During the lapse of the collision, a driver may move towards the front of the vehicle. Some of this motion derives from slack in seat belts, while additional movement of the driver's arms and legs occur since they are stretched out during the deceleration. If a foot of the driver rests on a pedal, the foot may be impacted by the pedal, while the driver moves forward in the vehicle. The forced angle between the foot and the lower leg may in this case cause degradation to the foot. Degradation to the foot or lower leg may also be caused by pedals intruding into the passenger compartment if the vehicle deforms.

Document EP 1 709 505 B1 discloses a pedal support for a vehicle, comprising a bracket, which is secured in a bulkhead disposed in the vehicle between a passenger compartment of the vehicle and an engine room; a first shaft secured in the bracket and horizontal and transversely directed in relation to the direction of travel of the vehicle; a pedal arm provided with a footplate and pivotal about the first shaft; an operating device which is secured in the pedal arm a distance from the first shaft and which is disposed for maneuvering or controlling a vehicle function, for example a braking function.

The first shaft is movably disposed in the bracket in the direction of travel of the vehicle, the first shaft having a normal position locked by means of a locking device. The locking device is, in the event of a vehicle collision, openable for permitting displacement of the first shaft to a safety position where the footplate is displaced away from the legs/feet of the vehicle driver but where the function of the operating device is at least partly retained. Hence, the disclosure of EP 1 709 505 B1 uses the principle of releasing the pedal hub from the bracket in case of a vehicle collision.

An alternative solution is presented in DE 196 17 372 C1, wherein a device is disclosed which comprises a brake pedal which remote from its step surface has first link point for pivotable connection in the vehicle. Between the first link point and the step surface is a second link point, intended for the rigid coupling with the entry member of a main brake cylinder. In case of a collision, the brake pedal may be uncoupled either at its first link point from its linkage or at its second link point from the rigid connection with the entry member of a brake cylinder. According to a second embodiment, the pedal hub is not through-going but instead comprises two pistons, which may be displaced sideways, such that the brake pedal is released. Hence, this embodiment discloses the principle of splitting the pedal hub into parts and removing the parts in order to release the pedal.

Both the above solutions are rather complicated involving many parts. In addition, the above safety arrangements influence the choice of material for the pedal and bracket as well as the fitting-in of adjacent parts in the vehicle. It is thus desirable to provide an alternative safety arrangement.

SUMMARY

The object of the present disclosure is to overcome or ameliorate at least one of the disadvantages of the prior art, or to provide a useful alternative. It is desirable to provide a safety arrangement being less complicated than arrangements according to prior art. It is further desirable to provide a safety arrangement wherein a pedal structure is at least partly operatively decouple-able from the pedal hub. The objects above may be achieved by the subject-matter of claim 1.

Thus, in a first aspect of the present description there is provided a safety arrangement for a vehicle pedal, comprising: a pedal structure comprising; a pedal arm with an elongated shape for carrying a pedal plate; a bracket, which is fixedly connected to the pedal arm; a pedal hub, to be arranged in order to transfer a movement of the pedal structure to a vehicular system.

The pedal structure is in a first position relative to the pedal hub during normal operation of the pedal structure. Further, the pedal structure is displaceable from the first position relative to the pedal hub to a second position relative to the pedal hub. In the second position, the pedal structure is at least partly operatively decoupled from the pedal hub. The pedal arm and the bracket moves together as one unit when being displaced from the first to the second position.

During normal operation (e.g., when a driver drives the vehicle), the pedal structure is in a first position relative to the pedal hub (e.g., a position wherein operative movements of the pedal plate made by the driver, by pressing the pedal plate with his/her foot for example), may be transferred from the pedal structure to the vehicular system. The pedal arm may act as a lever for the pedal plate having the pedal hub as its pivot axis. The vehicular system may be a braking system, the pedal being a brake pedal. The pedal arm of the brake pedal may be connected to a brake booster by an arm, which transfers a force applied by the driver on the pedal plate to the brake booster. Since the distance between the pedal hub and the pedal plate is larger than the distance between the pedal hub and the connection of the arm to the pedal arm by a certain factor, the force applied to the brake booster will be increased by that factor. Alternatively, the vehicular system may be a clutch system, the pedal being a clutch pedal.

In the second position, there is only partial or no operative contact between the pedal hub and the pedal structure (e.g., the pedal structure is at least partly operatively decoupled from the pedal hub). The displacement between the first and the second positions involves a displacement of the pedal hub relative to the pedal structure. The position of the pivot axis for the pedal arm may be displaced in relation to the pedal structure. Thereby the pedal plate may be free to move towards the front of the vehicle and/or towards the floor of the vehicle. Alternatively, the pedal structure may be completely released from the pedal hub and fall to the floor. If the foot of the driver rests on the pedal plate during the collision, the pedal plate will thus give way and move towards the front of the vehicle and/or towards the floor of the vehicle, hence reducing the risk of foot degradation. In addition, if the collision causes the pedal plate and/or the pedal arm to intrude into the passenger compartment because of deformation of the vehicle, the pedal plate and/or the pedal arm will give way, if it encounters a person in the vehicle. The pedal plate will in addition not transfer any movement or impulse from the brake booster into the driver's foot.

The displacement between the first position and the second position is to be done in case of a collision situation (e.g., a situation in which a collision is occurring or about to occur). A modern vehicle may comprise an anti-collision system. Using a collision sensor, e.g. one or more of a camera, IR-camera, radar or lidar, the anti-collision system may detect that a collision is about to occur, and thus prepare the vehicle for the collision in order to minimize interferences to persons in the vehicle and the vehicle itself, e.g. by activating airbags. One part in this preparation may be to initiate displacement of the pedal structure from the first position relative to the pedal hub to the second position relative to the pedal hub, as suggested herein.

As an alternative, or an additional possibility, the displacement between the first position and the second position may be performed during the lapse of the collision by means of a collision force. The collision force may for example arise from the impact of a foot of a driver being located on the pedal plate, and/or from the deceleration of the vehicle, when the safety arrangement is pushed rearwards in the vehicle (e.g., towards the driver) during the collision.

In an example, the pedal arm acts as a lever for the pedal plate, the lever having the pedal hub as its pivot axis, and the displacement between the first position and the second position for the pedal structure relative to the pedal hub involves a displacement of the pedal hub relative to the pedal arm.

In an example, the pedal structure has an upper end forming a passage for the pedal hub. The passage is arranged to provide the first position and the second position for the pedal structure relative to the pedal hub, wherein the pedal arm and the pedal hub are in operative contact in the first position, and an interspace is formed between the pedal arm and the pedal hub in the second position. The operative contact may be a physical contact, which is point-wise or extends along a portion the perimeter of the pedal hub. The physical contact may thus extend along between 1% and 50% of the circumference of the pedal hub, preferably between 10% and 45%, and most preferably between 15% and 40%.

A means for enabling the displacement between the first position and the second position may be located in the pedal hub and/or the pedal structure (e.g., in the bracket). The displacement may be achieved by displacement of the pedal structure only, by displacement of the pedal hub only, or by displacement of both in relation to the rest of the vehicle.

The passage essentially extends in the lateral direction of the vehicle. The passage goes through the pedal arm and optionally through the bracket. The pedal hub extends through the passage when mounted in the vehicle. The perimeter of the passage may provide the above-mentioned first and second positions of the pedal structure relative to the pedal hub. The passage may for example have two regions, which may be partly overlapping, corresponding to the first and second positions. The displacement between the first and second positions may thus be a lateral displacement seen in relation to the passage, which corresponds to a longitudinal and/or height displacement when seen in relation to the vehicle.

The passage may have a closed perimeter, or it may alternatively be partly open (e.g., open at the side directed towards the front of the vehicle when mounted). The passage may have the same shape in both the bracket and the pedal arm or have different shapes (e.g., the passage in the pedal arm only comprising part of the perimeter formed in the bracket).

If the passage has an essentially closed perimeter, it may be possible for a pedal hub being in the second position relative to the pedal structure to anyway transfer an operative movement made by the driver, if the pedal hub for example is pressed against the rear wall of the passage (e.g., at the side towards the front of the vehicle when mounted). However, since the location of the pivot axis of the pedal arm (e.g., the pedal hub) is displaced in relation to the pedal arm, the transfer of operative movements differs from during normal operation. In this case, there is partial operative contact in the second position.

If instead the perimeter of the passage is party open at the side towards the front of the vehicle, there is no such rear wall of the passage. In this case, there may be no operative contact in the second position.

The safety arrangement may further comprise a release device being connected to the pedal structure, the release device having at least a normal position and a collision position and being displaceable therebetween. The release device abuts against the pedal hub. When in the normal position, the release device holds the pedal hub and the pedal structure in the first position. When in the collision position, the release device allows the pedal hub and the pedal structure to be in the second position relative to each other.

As an alternative, the release device may instead be connected to the pedal hub, the release device having at least a normal and a collision position and being displaceable therebetween. According to this alternative, the release device abuts against the pedal structure.

The release device may be pivotally connected to the pedal structure by a release pivot axis, wherein the displacement of the release device between the normal position and the collision position involves a rotation of the release device around the release pivot axis. The position of the release pivot axis may be selected such that the normal operative forces are guided into the large structure of the pedal arm.

The safety arrangement may further comprise a locking device, which is connected to the bracket. The locking device has a first position, wherein it forms a mechanical stop holding the release device in its normal position. Further, the locking device is removable from its first position, thereby allowing movement of the release device to its collision position. The locking device may for example be moved out of the way of the release device. Alternatively, the locking device may be designed to break under the influence of the force from a triggering device (e.g., by a pyrotechnical means).

The safety arrangement may be arranged such that a force for removing the locking device from its first position, at the location of the locking device, acts in a direction essentially perpendicular to a resultant operating force on the release device used for normal operation of the pedal structure. This may be achieved by the positioning of the release pivot axis of the release device and/or the shape of the release device. Thereby the risk of unintentional displacement or removal of the locking device is reduced or avoided. The force moving the locking device out of the way of the release device may be directed essentially radially in relation to the release pivot axis, while the resultant force during normal operation essentially may be in the tangential direction in relation to the release pivot axis.

The locking device may further have a second position. The locking device is removable from its first position by a displacement to its second position allowing movement of the release device to its collision position. The first and second positions of the locking device are advantageously arranged such that the above-mentioned perpendicular force situation occurs.

The bracket may comprise at least one plate at a lateral side of the pedal arm, preferably a plate at each lateral side, with lateral side being related to the lateral direction of the vehicle when the safety arrangement is mounted in the vehicle. The locking device may move within a slot in the plate/plates during the displacement between the first and second positions of the locking device. Preferably the slot is shaped such that the force for displacing the locking device from its first position to its second position, at the location of the locking device, acts in a direction essentially perpendicular to a resultant operating force on the release device used for normal operation of the pedal structure. The locking device may e.g. be displaced in the radial direction in relation to the release pivot axis.

The safety arrangement may further comprise a locking device remover, the locking device remover being movable, thereby performing the removal of the locking device from its first position. The locking device remover may thus perform the above movement of the locking device in the slot (e.g., by having the locking device remover push the locking device in front of it).

For moving the locking device, the locking device remover may comprise an inclined surface, which is arranged to remove the locking device from its first position. The locking device may be displaced to the side (e.g., out of the way of the release device). The inclined surface may be a slot in the locking device remover. Alternatively, the locking device remover may comprise a wedge-shaped surface. The inclined surface may move in an essentially tangential direction in relation to the release pivot axis, thereby displacing the locking device in an essentially radial direction in relation to the release pivot axis.

The displacement of the locking device remover may be performed by a triggering device (e.g., by a pyrotechnical means), being released in an essentially tangential direction in relation to the release pivot axis, thereby pushing the locking device remover in front of it, the locking device remover in turn pushing the locking device out of the way from the release device. As an alternative, the locking device remover may be omitted. The triggering device may in that case act directly on the locking device.

The safety arrangement may further comprise a bushing or biasing means located at the passage such that the pedal hub abuts against the bushing or biasing means, when the pedal hub and the pedal structure are in the first position relative to each other. The bushing or biasing means may help to hold the pedal structure in the first position relative to the pedal hub. The bushing or biasing means may further be used to compensate for production tolerances. The biasing means could for example be a spring.

The passage may comprise a nose. The nose may be formed in the bracket and/or the pedal arm, both forming parts of the passage. When the pedal hub and the pedal structure are displaced from the first position to the second position relative to each other, the pedal hub may pass the nose. The nose may help to keep the pedal structure in the operative contact with the pedal hub. The nose may help to minimize, or even avoid, sideways tilting of the pedal structure relative to the pedal hub; sideways relating to when the safety structure is mounted in a vehicle.

In a second aspect of the present description there is provided a vehicle comprising a safety arrangement for a vehicle pedal as described above. The vehicle may be any car or truck. The safety arrangement may also be used in other vehicles, vessels, aircraft, construction applications or rescue/security applications.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

It should be noted that the appended drawings are not necessarily drawn to scale and that the dimensions of some features of the present invention may have been exaggerated for the sake of clarity.

DETAILED DESCRIPTION

Figure 6:
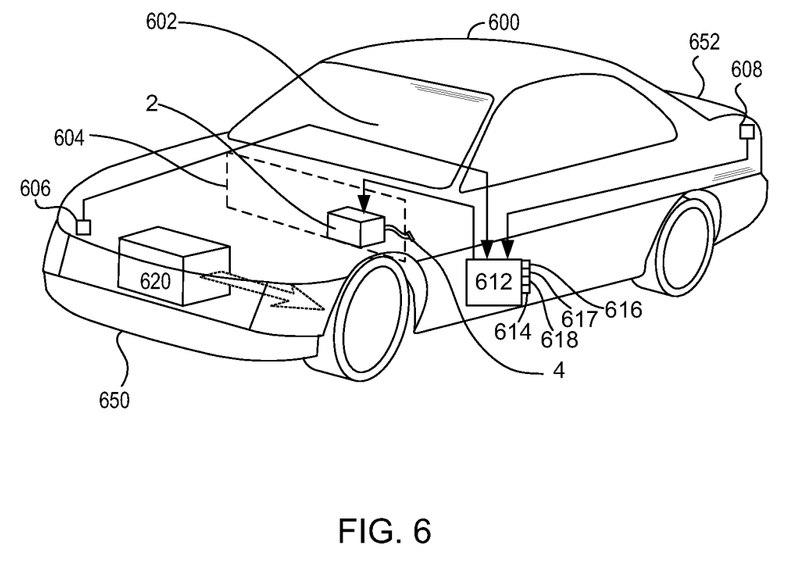
FIG. 6 is an example schematic view of a vehicle in which a safety arrangement may be positioned.
Figure 7:
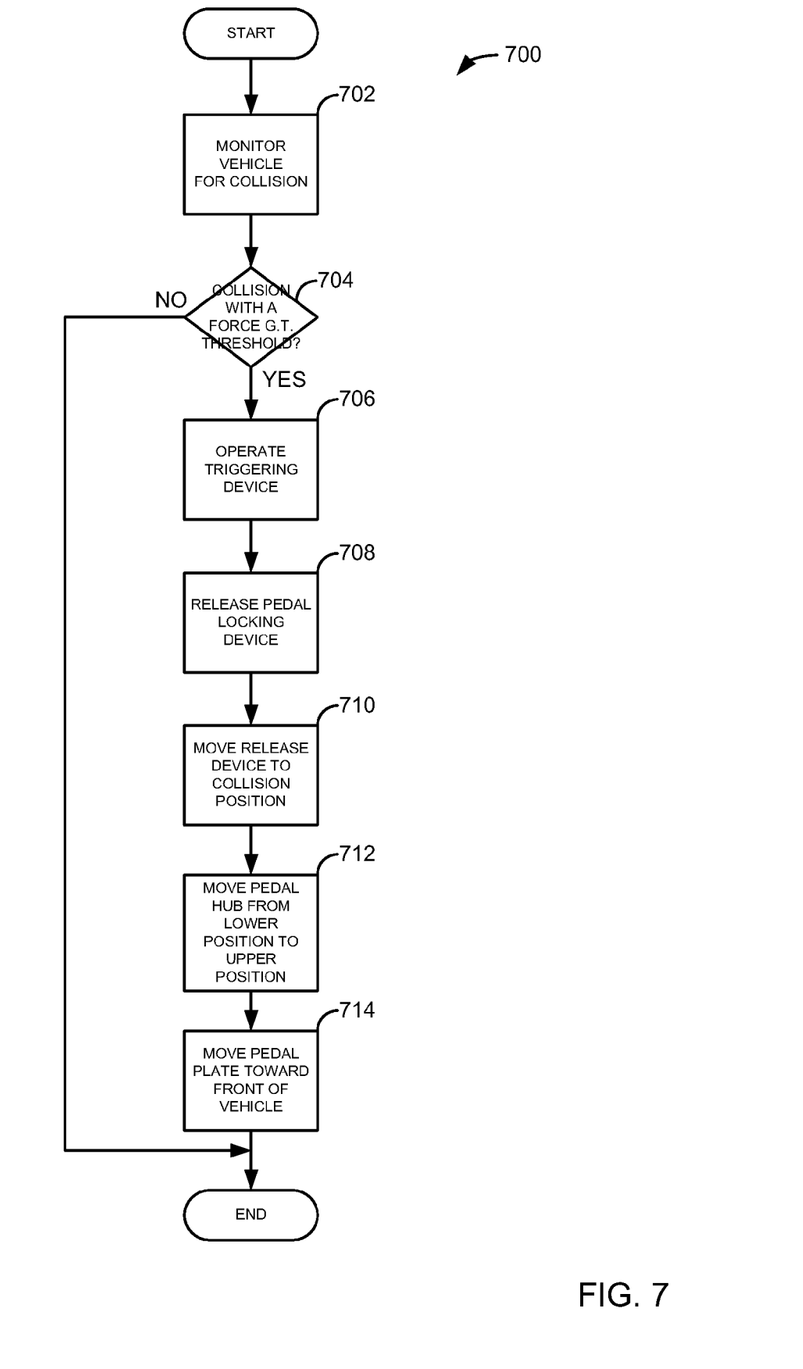
FIG. 7 is an example flowchart of an example method for operating a safety arrangement.

The present description is related to a safety arrangement. The safety arrangement may reduce the possibility of impacts between a driver and a vehicle component. FIGS. 1-5 show an example safety arrangement for a brake pedal. However, the safety arrangement described herein may also be applied to other pedals such as a clutch pedal. FIG. 6 shows an example vehicle in which the safety system may be positioned. Finally, FIG. 7 shows an example method for operating the safety system described herein.

The description will, in the following, be exemplified by various examples. It should however be realized that the examples are included in order to explain principles of the description and not to limit the scope of the description, defined by the appended claims. Details from two or more of the examples may be combined with each other.

Figure 1:
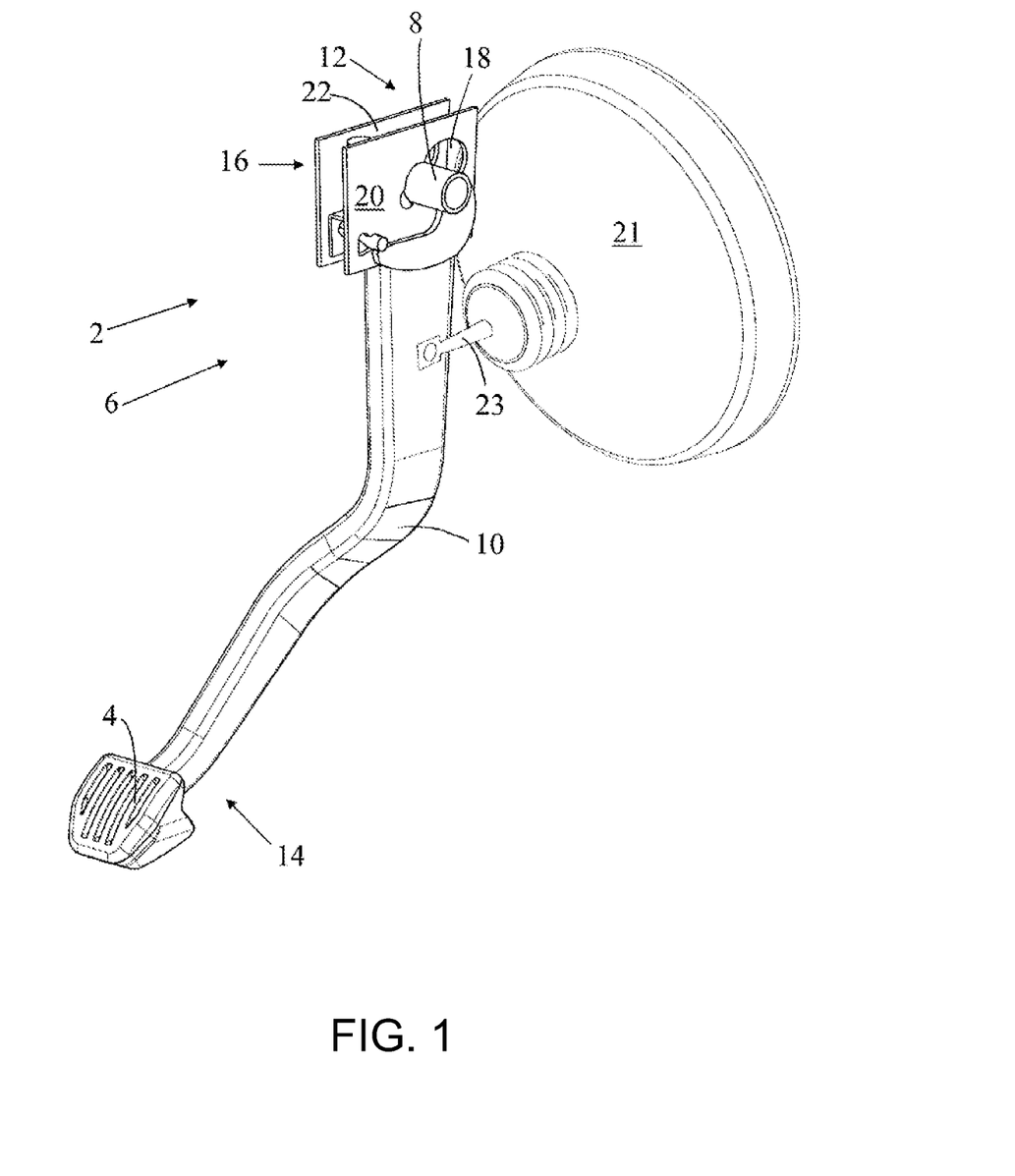
FIG. 1 is a schematic perspective view of a safety arrangement according to the description, with a pedal structure being in a first position relative to a pedal hub.

FIG. 1 schematically illustrates a safety arrangement 2 for a vehicle pedal according to the description. The vehicle pedal may be a brake pedal, as in FIG. 1, or a clutch pedal. The safety arrangement 2 comprises a pedal structure 6 and a pedal hub 8. The pedal hub 8 is illustrated in the form of a tube. Alternatively, not illustrated, it may be a solid axis. The pedal structure comprises a pedal arm 10 and a bracket 12. The pedal structure 6 has an elongated shape. A lower end 14 is adapted for carrying a pedal plate 4. An upper end 16 forms a passage 18 for the pedal hub 8. The terms "lower" and "upper" refers to the safety arrangement when mounted in a vehicle. The bracket 12 comprises a first plate 20 and a second plate 22 at each lateral side of the pedal arm 10. In addition, the bracket may comprise some additional components, which will be described in detail below. The passage 18 goes through the first plate 20, the pedal arm 10, and the second plate 22. The passage 18 is here exemplified as having a closed perimeter through the plates 20, 22, but it may also be partly open (e.g., being open at the side directed towards the front of the vehicle when mounted). The pedal arm 10 is connected to a brake booster 21 by an arm 23, which transfers a force applied by the driver on the pedal plate 4 to the brake booster 23 using the pedal arm 10 as a lever. Since the distance between the pedal hub 8 and the pedal plate 4 is larger than the distance between the pedal hub 8 and the connection of the arm 23 to the pedal arm 10 by a certain factor, the force applied to the brake booster 21 will be increased by that factor.

Figure 2:
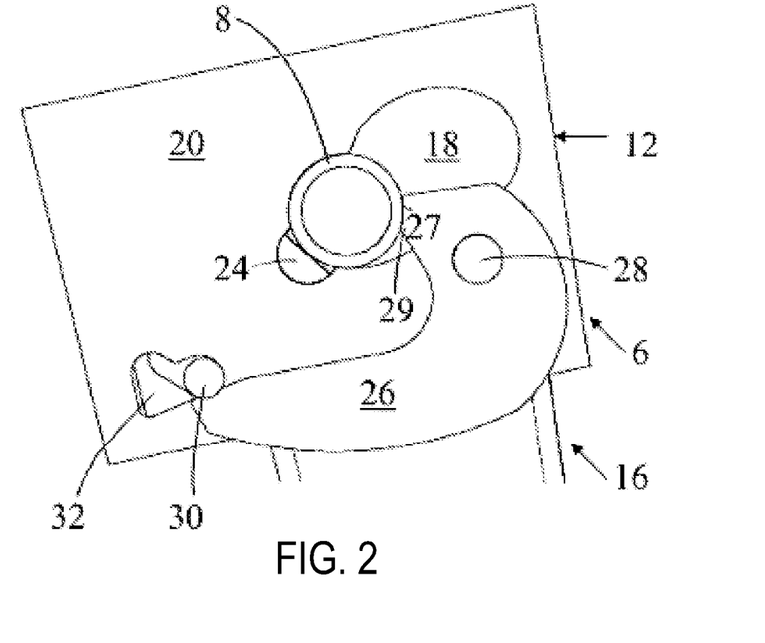
FIG. 2 is a side view of the safety arrangement of FIG. 1.

FIG. 2 is a side view of the safety arrangement of FIG. 1 showing the upper end 16 of the pedal arm and the bracket 12 in more detail. In this view, only the first plate 20 of the bracket 12 may be seen, while the second plate is hidden in this perspective. The pedal structure 6 is illustrated being in a first position relative to the pedal hub 8 (e.g., a position wherein operative movements of the pedal plate 4 made by the driver may be transferred from the pedal structure 6 to a vehicular system) such as a braking system. There is then operative contact between the pedal hub 8 and the pedal structure 6. The pedal structure 6 also comprises a bushing 24. The bushing 24 may help to hold the pedal structure 6 in the operative contact with the pedal hub 8. The bushing 24 may further be used to compensate for production tolerances. In order to achieve the operative contact, there is essentially physical contact between the outer surface of the pedal hub 8 and the perimeter of the passage 18 or the bushing 24 along the circumference of the pedal hub 8. The physical contact may thus extend along between 1% and 50% of the circumference of the pedal hub, preferably between 10% and 45%, and most preferably between 15% and 40%.

FIG. 2 further illustrates a release device 26, which is connected to the pedal structure 6 by a release pivot axis 28. The release device 26 abuts against the pedal hub 8. The release device 26 is in its normal position, holding the pedal structure 6 in the first position relative to the pedal hub 8. As may be gleaned from the FIG. 2, the pedal hub 8 is held between the release device 26, the inner surface of the passage 18 and the bushing 24. The release device 26 has the form of a hook, wherein an end of the hook abuts against the pedal hub 8 in the first position. The end comprises an adapted surface 27, which corresponds to the curvature of the pedal hub 8, thus providing not only point-wise abutment, but abutment along an extended surface. The adapted surface 27 ends at a corner 29. The shape and position of the adapted surface 27 and the corner 29 may be selected to achieve the desired positioning of the pedal hub 8 in the second position, as described below in conjunction with FIG. 5. In addition, the shape and position of the adapted surface 27 and the corner 29 may be chosen to transfer forces from the pedal hub 8 to the release pivot axis 28. The position of the release pivot axis 28 may be selected such that the normal operative forces are guided into the large structure of the pedal arm 10. The bracket 12 further comprises a locking device 30, exemplified by a lock pin. The locking device 30 is illustrated being in its first position, wherein the release device 26 abuts against the locking device 30. The locking device 30 thus forms a mechanical stop holding the release device 26 in its normal position. The bracket has a slot 32, wherein the locking device 30 may move when being displaced to a second position as explained further below.

Figure 3:
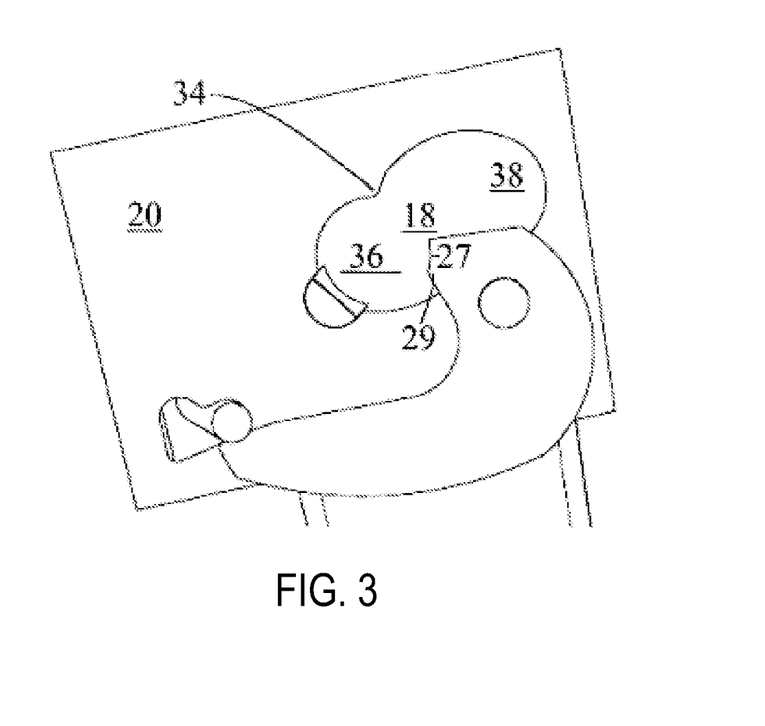
FIG. 3 is a side view of the safety arrangement of FIG. 1, with the pedal hub removed for clarity.

In FIG. 3, the pedal hub 8 has been removed from FIG. 2 in order to show the passage 18 more clearly. As may be gleaned from the FIG. 3, the perimeter of the passage 18 comprises a nose 34, which may be formed in the first 20 and second plate 22. The nose 34 may help to keep the pedal structure 6 in the operative contact with the pedal hub 8. The nose 34 may further help to minimize, or even avoid, sideways tilting of the pedal structure 6 relative to the pedal hub 8, sideways relating to when the safety structure is mounted in a vehicle. It is also seen that the passage 18 comprises a lower portion 36 corresponding to the first position, wherein the pedal structure 6 is in the operative contact with the pedal hub 8. Further, the passage 18 comprises an upper portion 38, corresponding to a second position of the pedal hub 8 relative to the pedal structure 6, which position will be explained further below in conjunction with FIG. 5. As may be gleaned from FIG. 3, the diameter of the upper portion 38 may be larger than for the lower portion 36.

Figure 4:
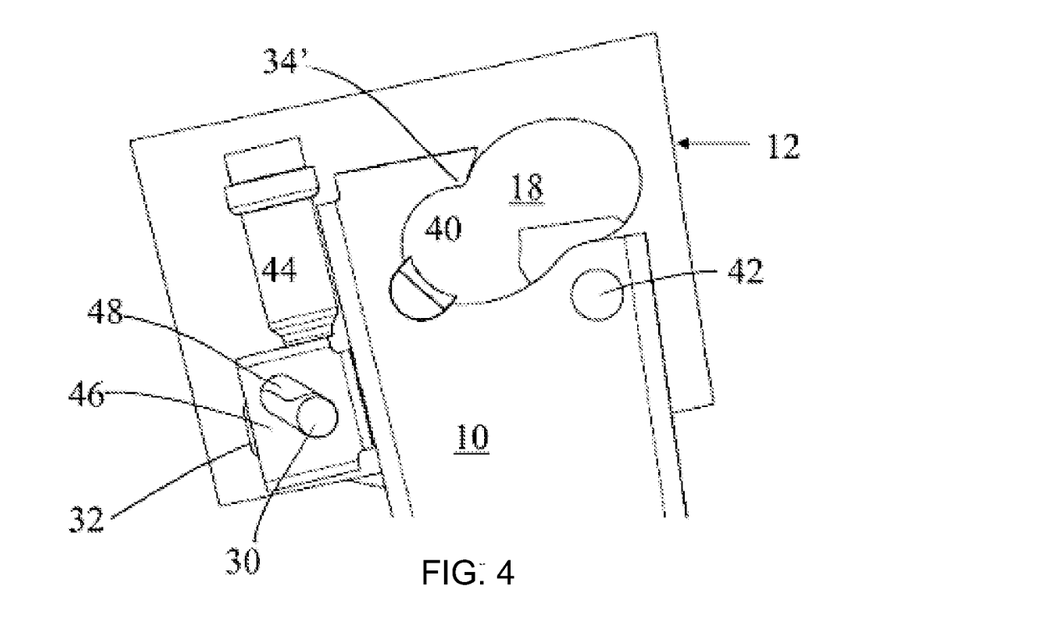
FIG. 4 is a side view of the safety arrangement of FIG. 1, with the pedal hub and one of the bracket plates removed for clarity.

In FIG. 4, the first plate 20 has been removed from FIG. 3 in order to show the interior of the safety arrangement more clearly. As may be gleaned from FIG. 4, the pedal arm 10 has an indentation 40 forming part of the passage 18, although it does not extend along the whole perimeter of the passage 18. The indentation has a nose 34' forming part of the nose of the passage 18, thus being located at a position corresponding to the nose 34 formed in the plates 20, 22. The nose 34' of the pedal arm is optional; the nose may be formed in the plates 20, 22 and/or the pedal arm 10. The purpose of the nose 34' is to help keeping the pedal structure 6 in the operative contact with the pedal hub 8 in the first position. The nose 34' may further help to minimize, or even avoid, sideways tilting of the pedal structure 6 relative to the pedal hub 8, sideways relating to when the safety structure is mounted in a vehicle. The pedal arm 10 also comprises an opening 42, through which the release pivot axis 28 may pass. The safety arrangement further comprises a triggering means, e.g. a pyrotechnical means 44. There is also a locking device remover 46, having an inclined slot 48, in which the locking device 30 may move.

Figure 5:
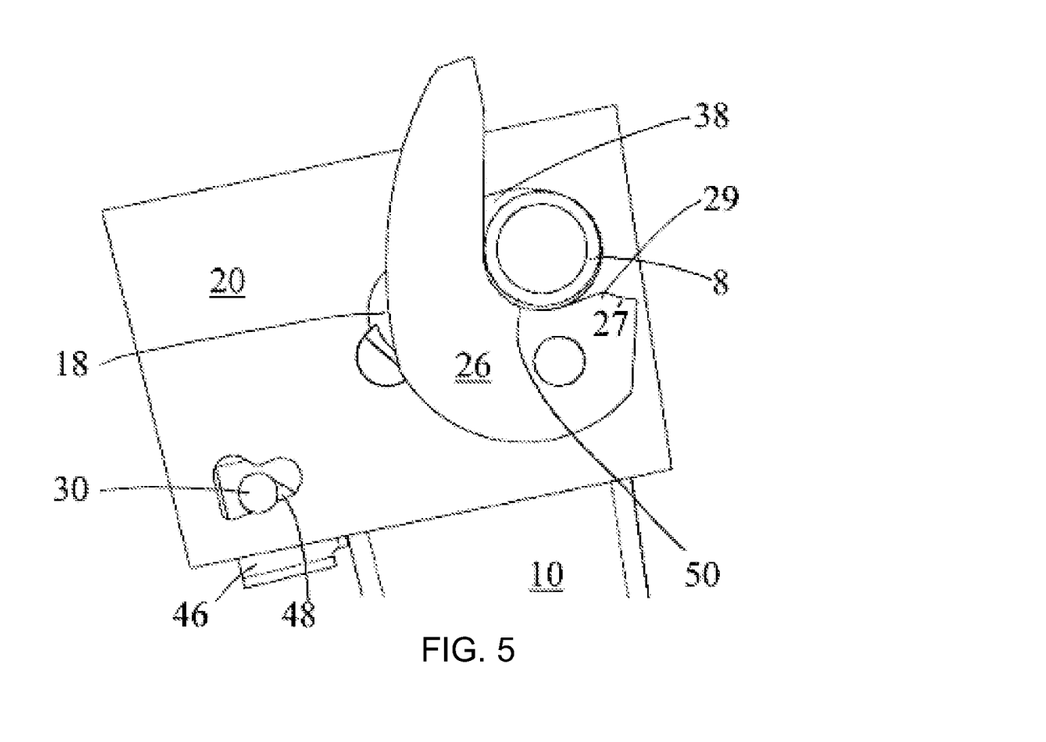
FIG. 5 is a side view of the safety arrangement of FIG. 1, with the pedal structure being in a second position relative to the pedal hub.

FIG. 5 illustrates the safety device 2 being in the second position. The transfer between the first position, as in FIGS. 1-4, and the second position of FIG. 5 is explained below. The release device 26 abuts against the pedal hub 8 along a curved surface 50.

In the second position, as in FIG. 5, the pedal hub 8 resides in the upper portion 38 of the passage 18, wherein the pedal hub 8 has essentially no physical contact with the pedal arm 10. The pedal structure 6 hangs freely rotatable on the pedal hub 8. The pedal plate 4 is hence free to move towards the front of the vehicle and/or towards the floor of the vehicle. The pedal hub 8 is located against a rear wall of the bracket 12, i.e. at the side towards the front of the vehicle. The pivot axis of the pedal arm 10 (e.g., the pedal hub 8) has hence been displaced from the first position to the second position. In the second position it may be possible to anyway transfer an operative movement made by the driver. However, since the location of the pivot axis of the pedal arm 10 (e.g., the pedal hub 8) is displaced in relation to the pedal arm 10, the transfer of operative movements differs from during normal operation. In the illustrated example of FIG. 5, the pedal arm 10 will in principle pivot around the second position. However, the pedal arm 10 is still connected by the arm 23 to the brake booster 21, as explained for FIG. 1. Therefore, the driver may still use the brake pedal, although the pedal arm 10 now has another pivot point, giving the pedal plate 4 another location, which is more beneficial for avoiding foot impact, as explained below.

When a collision sensor, not illustrated, detects a collision situation (e.g., it detects that a collision is occurring or about to occur), it may trigger the triggering device here pyrotechnical means 44. When the pyrotechnical means 44 is triggered, it will generate a release force in an essentially tangential direction in relation to the release pivot axis 28. The release force will push the locking device remover 46 in the essentially tangential direction in relation to the release pivot axis 28, in FIG. 5 essentially downwards. The locking device remover 46 in turn will move the locking device 30 in an essentially radial direction in relation to the release pivot axis 28, in FIG. 5 essentially sideways, due to the inclined surface of the slot 48. When the locking device 30 is moved radially, it will finally be moved out of the way of the release device 26, and allowing displacement of the release device 26 to its collision position, as seen in FIG. 5. Thereby, the release device 26 allows the pedal hub 8 to move from the lower portion 36 of the passage 18 to the upper portion 38. The pedal hub 8 then passes over the nose 34 of the plates 20, 22 and the nose 34' of the pedal arm 10. During the displacement, the pedal hub 8 moves along the surface of the release device 26, from the adapted surface 27, over the corner 29 and further along the curved surface 50.

The force used for displacing the release device 26 to its collision position and moving the pedal hub 8 relative to the pedal structure 6 may come from the foot of the driver on the pedal plate 4 or by the deceleration of the vehicle. In the upper region 38 the pedal hub 8 has essentially no physical contact with the pedal arm 10. The pedal structure 6 hangs freely rotatable on the pedal hub 8 and the pedal plate 4 is free to move towards the front of the vehicle and/or towards the floor of the vehicle.

If the foot of the driver rests on the pedal plate 4 during the collision, the pedal plate 4 will thus give way and move towards the front of the vehicle and/or towards the floor of the vehicle, hence reducing the risk of a foot impact. In addition, if the collision causes the pedal plate 4 and/or the pedal arm 10 to intrude into the passenger compartment because of deformation of the vehicle, the pedal plate 4 and/or the pedal arm 10 will give way if it encounters the body of a person in the vehicle. The pedal plate 4 will in addition not transfer any movement or impulse from the brake booster 23 into the driver's foot.

Thus, the system of FIGS. 1-5 provides for a safety arrangement for a vehicle pedal, comprising: a pedal structure comprising a pedal arm with an elongated shape for carrying a pedal plate and a bracket, which is fixedly connected to said pedal arm; and a pedal hub arranged to transfer a movement of the pedal structure to a vehicular system, the pedal structure being in a first position relative to the pedal hub during normal operation of the pedal structure, the pedal structure displaceable from the first position relative to the pedal hub to a second position relative to the pedal hub, and where the pedal structure is at least partly operatively decoupled from the pedal hub when in the second position. This system may reduce the force between a driver and a pedal during a vehicle collision.

In one example, the safety arrangement includes where the pedal arm acts as a lever for the pedal plate, the lever including the pedal hum as its pivot axis, and a displacement between the first position and the second position for the pedal structure relative to the pedal hub includes a displacement of the pedal hub relative to the pedal arm. The safety arrangement includes where the pedal structure has a upper end forming a passage for the pedal hub, the passage providing the first position and the second position for the pedal structure relative to the pedal hub, the pedal arm and the pedal hub being in operative contact in the first position, and an interspace being formed between the pedal arm and the pedal hub in the second position. The safety arrangement further comprises a collision sensor, the collision sensor in mechanical or electrical communication with a device that displaces the pedal structure between the first position and the second position relative to the pedal hub during a vehicle collision.

In another example, the safety arrangement further comprises a release device in mechanical communication to the pedal structure, the release device including at least a normal position and a collision position, and being displaceable therebetween, the release device abutting against the pedal hub such that when in the normal position, the release device holds the pedal hub and the pedal structure in the first position relative to each other, and when in the collision position, the release device allows the pedal hub and the pedal structure to be in the second position relative to each other. The safety arrangement includes where the release device is pivotally coupled to the pedal structure by a release pivot axis and where a displacement of the release device between the normal position and the collision position involves a rotation of the release device around the release pivot axis. The safety arrangement further comprises a locking device coupled to bracket, the locking device including a first position, where it forms a mechanical stop that holds the release device in its normal position, the locking device being removable from its first position, thereby allowing movement of the release device to its collision position. The safety arrangement includes where a force for removing the locking device from its first position, at the location of the locking device, acts in a direction substantially perpendicular (e.g., ±25 degrees of perpendicular) to a resultant operating force on the release device used for normal operation of the pedal structure.

The safety arrangement also includes where the locking device further includes a second position, the locking device being removable from its first position by a displacement to its second position, and when in the second position allowing movement of the release device to its collision position. The safety arrangement includes where the bracket comprises at least one plate at a lateral side of the pedal arm, a plate at each lateral side, the locking device moving within a slot in the plate during the displacement between its first and second positions. The safety arrangement further comprises a locking device remover, the locking device remover being movable, the locking device remover allowing removal of the locking device from its first position.

The safety arrangement also includes where the locking device remover comprises an inclined surface that is arranged to remove the locking device from its first position. The safety arrangement includes where movement of the locking device remover is performed by a triggering device by a pyrotechnical device. The safety arrangement further comprises a bushing or biasing device located in the passage such that the pedal hub abuts against the bushing or biasing device when the pedal hub abuts against the bushing or biasing device and when the pedal hub and the pedal structure are in the first position relative to each other. The safety arrangement further comprises the pedal plate positioned within a vehicle.

Referring now to FIG. 6, a vehicle in which the safety arrangement 2 may be positioned is shown. Vehicle 600 may include all elements of the system shown in FIGS. 1-5. Vehicle 600 includes a front side 650 and a rear side 652. Vehicle 600 may include a motor or an engine 620 to propel vehicle 600. Vehicle 600 may also include a front collision sensor 606 and a rear collision sensor 608. Front collision sensor 606 detects frontal vehicle collisions and rear collision sensor 608 detects rear vehicle collisions. In one example, collision sensors 606 and 608 output a signal that is indicative of a collision force during a vehicle collision. The signal may increase in magnitude as the severity of the collision increases. Collision sensors 606 and 608 may be in electrical communication with controller 612. Based on signals from collision sensors 606 and 608, controller 612 judges whether or not to operate safety arrangement 2 and move a pedal toward front side 650 of vehicle 600. Controller 612 may include random access memory 614, non-transitory memory 616, a CPU 618, and I/O 617. Safety arrangement 2 and pedal plate 4 are shown within passenger compartment 602 of vehicle 600. Safety arrangement may be mechanically coupled to bulkhead 604. Bulkhead 604 partitions passenger compartment 602 from engine 620.

Alternatively, collision sensors 606 and 608 may be in direct mechanical or electrical communication with safety arrangement 2. In particular, collision sensors 606 and 608 may be in electrical or mechanical communication with pyrotechnical device 44 shown in FIG. 4. Pyrotechnical device may operate when output of at least one of collision sensors 606 and 608 exceeds a predetermined level (e.g., a threshold voltage is exceeded).

Referring now to FIG. 7, an example method for operating a safety arrangement is shown. The method of FIG. 7 may be stored in non-transitory memory of a controller 612 shown in FIG. 6. Some steps of the method in FIG. 7 may be performed automatically during a collision as described in FIGS. 1-5. Alternatively, the entire method may be automatically performed via the system of FIGS. 1-5 during a vehicle collision.

At 702, method 700 monitors vehicle conditions for a collision. In one example, collision sensors output a signal that is indicative of the severity of a vehicle collision. In one example, the output of the collision sensor increases depending on the severity of a vehicle collision. Method 700 proceeds to 704 after monitoring the vehicle for a collision.

At 704, method 700 judges whether or not a collision force of the vehicle is greater than a threshold collision force. If so, method 700 proceeds to 706. Otherwise, method 700 exits.

At 706, a triggering device is operated in response to a collision having a force greater than a threshold force. In one example, the triggering device is a pyrotechnical device and it operates as is described in FIGS. 1-5. Method 700 proceeds to 708 after the triggering device is operated.

At 708, method 700 releases a pedal locking device. The pedal locking device is released as described in FIGS. 1-5. Method 700 proceeds to 710 after the pedal locking device is released.

At 710, method 700 moves a release device to a collision position. The release device moves to the collision position as described in FIGS. 1-5. Method 700 proceeds to 712 after moving the release device to the collision position.

At 712, method 700 moves a pedal hub from a lower position to an upper position. In the upper position, the pedal plate may move freely toward the front of the vehicle. Method 700 proceeds to 714 after moving the pedal hub as described in FIGS. 1-5.

At 714, method 700 moves a pedal plate toward a front of a vehicle so as to reduce the possibility of impact between the driver and the pedal plate. The pedal plate may move toward the front of the vehicle as a result of its kinetic energy. Alternatively, the pedal plate may move forward via the driver depressing the pedal plate. Method 700 exits after the pedal plate is moved away from the driver.

Further modifications of the description within the scope of the appended claims are feasible. As such, the present invention should not be considered as limited by the embodiments and figures described herein. Rather, the full scope of the invention should be determined by the appended claims, with reference to the description and drawings.

As will be appreciated by one of ordinary skill in the art, methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. This concludes the description. The reading of it by those skilled in the art would bring to mind many alterations and modifications without departing from the spirit and the scope of the description.

The invention claimed is:

1. A safety arrangement for a vehicle pedal, comprising:
a pedal structure comprising a pedal arm with an elongated shape for carrying a pedal plate and a bracket, the bracket fixedly connected to said pedal arm;
a pedal hub residing in a passage in the pedal structure, the pedal hub arranged to transfer a movement of the pedal structure to a vehicular system, the pedal structure being in a first position relative to the pedal hub during normal operation of the pedal structure, the pedal structure displaceable from the first position relative to the pedal hub to a second position relative to the pedal hub, and where the pedal structure is completely operatively decoupled from the pedal hub when in the second position; and
a release device which abuts against the pedal hub outside of the bracket, the release device pivotally coupled to the pedal structure by a release pivot axis passing through an opening in the pedal structure, the opening located below the passage.

2. The safety arrangement of claim 1, where the pedal arm acts as a lever for the pedal plate, the lever including the pedal hub as its pivot axis, and a displacement between the first position and the second position for the pedal structure relative to the pedal hub includes a displacement of the pedal hub relative to the pedal arm.

3. The safety arrangement of claim 2, where the passage provides the first position and the second position for the pedal structure relative to the pedal hub, the pedal arm and the pedal hub being in operative contact in the first position, and an interspace being formed between the pedal arm and the pedal hub in the second position.

4. The safety arrangement of claim 1, further comprising a collision sensor, the collision sensor in mechanical or electrical communication with a device that displaces the pedal structure between the first position and the second position relative to the pedal hub during a vehicle collision.

5. The safety arrangement of claim 4, wherein the release device includes at least a normal position and a collision position and is displaceable therebetween, and wherein the release device abuts against the pedal hub such that when in the normal position, the release device holds the pedal hub and the pedal structure in the first position relative to each other, and when in the collision position, the release device allows the pedal hub and the pedal structure to be in the second position relative to each other.

6. The safety arrangement of claim 5, where a displacement of the release device between the normal position and the collision position involves a rotation of the release device around the release pivot axis.

7. The safety arrangement of claim 6, further comprising a locking device coupled to a bracket, the locking device including a first position, where it forms a mechanical stop that holds the release device in its normal position, the locking device being removable from its first position, thereby allowing movement of the release device to its collision position.

8. The safety arrangement of claim 7, where a force for removing the locking device from its first position, at a location of the locking device, acts in a direction substantially perpendicular to a resultant operating force on the release device used for normal operation of the pedal structure.

9. The safety arrangement of claim 8, where the locking device further includes a second position, the locking device being removable from its first position by a displacement to its second position, and when in the second position allowing movement of the release device to its collision position.

10. The safety arrangement of claim 9, where the bracket comprises a plate at each lateral side of the pedal arm, the locking device moving within a slot in the plate during the displacement between its first and second positions.

11. The safety arrangement of claim 10, further comprising a locking device remover, the locking device remover being movable, the locking device remover allowing removal of the locking device from its first position.

12. The safety arrangement of claim 11, where the locking device remover comprises an inclined surface that is arranged to remove the locking device from its first position.

13. The safety arrangement of claim 12, where movement of the locking device remover is performed by a triggering device by a pyrotechnical device.

14. The safety arrangement of claim 13, further comprising a bushing or biasing device located in the passage such that the pedal hub abuts against the bushing or biasing device when the pedal hub and the pedal structure are in the first position relative to each other.

15. The safety arrangement of claim 1, further comprising the pedal plate positioned within a vehicle.

16. A method for operating a vehicle pedal, comprising:
   operating the vehicle pedal in a first position, the vehicle pedal including a pedal hub and a pedal structure, the pedal hub residing in a passage in the pedal structure, the pedal structure comprising a bracket having a plate on each lateral side of a pedal arm of the pedal structure, where in the first position the pedal hub and pedal structure are operatively coupled, and where a release device abuts against the pedal hub outside of the bracket and is pivotally coupled to the pedal structure by a release pivot axis passing through an opening in the pedal structure, the opening located below the passage;
   in response to a vehicle collision, operating a pyrotechnical device to displace the vehicle pedal from the first position to a second position where the pedal structure is completely operatively decoupled from the pedal hub; and
   after operating the pyrotechnical device, adjusting a pedal to a position toward a front of a vehicle.

17. The method of claim 16, further comprising releasing a pedal locking device in response to operating the pyrotechnical device.

18. The method of claim 17, further comprising moving the release device to a collision position in response to releasing the pedal locking device.

19. The method of claim 18, further comprising moving the pedal hub in response to moving the release device to the collision position.

20. The method of claim 18, where the release device rotates during the vehicle collision.

* * * * *